(12) United States Patent
Beasley, Jr.

(10) Patent No.: US 11,369,102 B2
(45) Date of Patent: Jun. 28, 2022

(54) FISHING ROD HOLDER

(71) Applicant: Michael D. Beasley, Jr., Smyrna, GA (US)

(72) Inventor: Michael D. Beasley, Jr., Smyrna, GA (US)

(*) Notice: Subject to any disclaimer, the term of this patent is extended or adjusted under 35 U.S.C. 154(b) by 116 days.

(21) Appl. No.: 16/901,005

(22) Filed: Jun. 15, 2020

(65) Prior Publication Data

US 2020/0323188 A1 Oct. 15, 2020

Related U.S. Application Data

(60) Provisional application No. 62/883,911, filed on Aug. 7, 2019.

(51) Int. Cl.
*A01K 97/08* (2006.01)
*B60R 9/08* (2006.01)

(52) U.S. Cl.
CPC ............... *A01K 97/08* (2013.01); *B60R 9/08* (2013.01)

(58) Field of Classification Search
CPC .. A01K 97/08; B60R 9/08; A45F 5/00; A63B 71/0036; B65D 85/20
See application file for complete search history.

(56) References Cited

U.S. PATENT DOCUMENTS

| | | | |
|---|---|---|---|
| 3,495,750 A * | 2/1970 | Milheiro | B60R 9/045 224/322 |
| 4,681,247 A * | 7/1987 | Prosen | B60R 9/08 224/322 |
| 6,561,471 B1 * | 5/2003 | Hawie | F16M 11/041 248/74.1 |
| 8,333,358 B2 * | 12/2012 | Carnes | A01K 97/10 43/25 |
| 8,393,111 B1 * | 3/2013 | Johnson | A01K 97/10 43/21.2 |
| 8,746,469 B1 * | 6/2014 | De La Torre | A01K 97/08 224/922 |
| 10,542,738 B2 * | 1/2020 | Moses | A47B 81/005 |
| 2010/0187270 A1 * | 7/2010 | Puglisi | A45F 5/022 224/191 |
| 2013/0229025 A1 * | 9/2013 | Johnasen | B60P 3/00 296/3 |
| 2014/0295983 A1 * | 10/2014 | Nooner | A63B 24/0003 473/223 |
| 2016/0039355 A1 * | 2/2016 | Settelmayer | B60R 9/10 224/324 |
| 2018/0290042 A1 * | 10/2018 | Vester | A47F 5/101 |
| 2019/0045922 A1 * | 2/2019 | Jacobs | A01K 97/10 |
| 2020/0170430 A1 * | 6/2020 | Wainhouse | A47G 23/0225 |
| 2020/0307464 A1 * | 10/2020 | McFadden | A01K 97/10 |

* cited by examiner

*Primary Examiner* — Timothy D Collins
*Assistant Examiner* — Maria E Graber
(74) *Attorney, Agent, or Firm* — Barry Choobin; Patent 360

(57) ABSTRACT

The present invention is directed to an apparatus for holding and transporting an elongated article, such as a fish rod. The apparatus comprises a telescoping member having a proximal end and a distal end; a pair of caps coupled to the proximal end and the distal end of the telescoping member; a first mounting member releasably coupled to the telescoping member; a second mounting member releasably coupled to the first mounting member, the second mounting member is configured to receive and hold an elongated article; a pair of hook and loop fastener straps each of which is coupled to each of the pair of caps; and a pair of wall mounting brackets.

13 Claims, 18 Drawing Sheets

FISHING ROD HOLDER

FIELD OF INVENTION

The present invention relates to an apparatus for holding and transporting an elongated article, and in particular, the present invention relates to an apparatus for holding and transporting a fishing rod.

BACKGROUND

Fishing is both a popular hobby and sports among men, women, and children. Fishing rods, also known as fishing sticks, are a tool for fishing. A fishing rod is a long, flexible rod used for catching a fish. In its simplest form, the fishing rod is a long stick attached to a line ending in a hook. The length of the fishing rods can vary from 2 to 20 feet. Traditionally the fishing rods were manufacture from bamboo but there have been immense advances in both the material and structure of the fishing rods. Modern fishing rods are manufactured from a range of composite materials that are both sturdy and light in weight. Besides the material of which the fishing rods can be manufactured from, modern fishing rods are equipped with advanced and complex machinery including reels and gears which take the fishing experience to the next level. However, modern fishing rods are also costly. Cost is proportional to the materials and features of the fishing rod. Fishing rods made of graphite materials are most expensive but lighter and stiffer.

Fishing rods can breakdown if not properly maintained. This includes both storing and transportation of the fishing rods. Fishing rod racks are commercially available for storing the fishing rods at homes. Similarly, fishing rod caddies are also available that can mount to a vehicle for carrying the fishing rods. For example, U.S. patent application Ser. No. 15/676,516 discloses rack apparatus for holding a plurality of fishing rods. The rack apparatus includes an elongate member having a base segment and first and second upturned end segments. The first upturned end segment has a plurality of open-ended slots and the second upturned end segment has a plurality of openings, with the same number of slots as openings. The openings are arranged and designed to receive the rod tip portion and the open-ended slots are arranged and designed to receive the rod handle. A strap is arranged and designed to circumvent the plurality of fishing rods and releasably secure the fishing rods to the elongate member. A handle for transporting the rack apparatus is connected to the base segment and there is at least one fastener for releasably securing the elongate member to a surface of a boat.

Another granted U.S. Pat. No. 8,746,469 discloses a fishing rod caddy that is removably mountable to the bed of a pickup truck. The fishing rod caddy (or rack or holder) is removably mountable to the bed of a pickup truck and which securely holds the rods in a horizontal position such the rods are free from bending loads created by wind resistance and are protected from undue jostling during transport. The present invention fishing rod caddy places the rods within the bed of a pickup truck such that the rods are below the upper surface of the bed rails and therefore substantially removed from air slipstream created when the pickup truck is underway.

The apparatuses known in the art for holding and transporting the fishing rods suffer from one or more disadvantages. For example, such known apparatuses are bulks and costly. Moreover, the different apparatuses may be needed for storing and transporting of the fishing rods in vehicles. Fishing rods are generally mounted outside the vehicle for transportation which exposes them to theft. Some apparatuses may require drilling additional screw holes to mount the rack to the vehicle. The rack, being secured through screws to the body, can be difficult to be removed later. Simply carrying the fishing rod inside the vehicle exposes them to damage.

Thus, a need is appreciated for an improved apparatus that is durable, sturdy, compact, easy to carry and can be used for both storage and transportation of the fishing rods.

SUMMARY OF THE INVENTION

The principal object of the present invention is therefore directed to an apparatus for holding and transporting elongated articles.

It is a further object of the present invention that the apparatus can hold and transport a fishing rod.

It is still a further object of the present invention that the apparatus can non-invasively mounts to a vehicle.

It is yet a further object of the present invention that the apparatus can be adapted according to the type of the vehicle.

It is another object of the present invention that the apparatus can be mounted to a supporting surface.

It is still another object of the present invention that the apparatus is economical to manufacture.

It is yet another object of the present invention that the apparatus is durable and easy to use.

In one aspect, the present invention directs to an apparatus for holding and transporting elongated objects, such as a fishing rod. The apparatus according to the present invention includes telescoping tubes i.e., an inner tube and an outer tube. Each of the inner tube and the outer tube having a proximal end and a distal end. The inner tube having a diameter less than the diameter of the outer tube, allowing the proximal end of the inner tube to be telescopically slidable within the outer tube. The proximal end of the inner tube, through the proximal end of the outer tube, can be slidably inserted into the outer tube. The proximal end of the outer tube can be configured with a sleeve glide and the proximal end of the inner tube can be provided with a plug.

In one aspect, the outer tube can be provided with a locking mechanism. The locking mechanism prevents the longitudinal movement of the first tube relative to the second tube. A user may adjust the length of the apparatus by releasing the lock and moving the inner tube up and down within the outer tube. The locking mechanism can be a collar that is rotatable to compress the inner tube and the outer tube, binding them at a set length. The lock may also be a set screw bolt that passes through the outer tube and presses against the inner tube. The outer tube and inner tube may be any shape of the elongate tube. In one implementation of the telescoping tubes, the inner tube and outer tube may be rectangular, elliptical, or triangular elongate tubes.

In one aspect, to each distal end of the inner tube and the outer tube can be coupled a cap. The cap is having a cap body with opposite ends. One end of the cap body is provided with a sleeve and the opposite end is provided with an L-shaped hook. The sleeve can be dimensioned to receive the distal end of the inner tube or the outer tube. The L-shaped hook having a first leg that extends from the body and a second leg that perpendicularly extends from the first leg.

In one aspect, the apparatus can further include a pair of hook and loop fastener strap, each of which is coupled to each of the pair of caps of the apparatus. Each cap can have a slot through with the hook and loop fastener strap can pass through.

In one aspect, the apparatus according to the present invention can further include a pair of wall mounting brackets. Each of the pair of wall mounting brackets having a base, the base having a flat bottom and two or more holes for receiving fasteners. The bracket can be mounted to a supporting structure, such as a wall using the fasteners. A spacer upstand from top of the base and the spacer is having a hollow interior and an open front. A tongue upstand from top of the base and is adjacent to the first opening of the spacer. The outer surface of the tongue having a lip. The tongue can flex inwards towards the spacer. The cap can be position over the bracket with its L-shaped bracket pressed over the spacer. The cap can be pushed over the spacer to snap-fit the cap to the wall mounting bracket.

In one aspect, the apparatus according to the present invention comprises a first mounting bracket having a rigid bracket part and a tie-down part. The rigid bracket part dimensioned to fit over the inner tube or the outer tube of the telescoping tubes. The tie-down part continues with the rigid bracket part. End of the first part can be configured with a tie-down lock which can receive and frictionally engage a free end of the tie-down part, coupling the first mounting member over one of the telescoping tubes.

In one aspect, the apparatus according to the present invention can further comprise a second mounting member. The second mounting member can be a rubber strap having a first end and an opposite second end, wherein the strap is coupled to the first mounting member at its first end, while the second end is free. Spaced apart apertures are configured into the strap between the first end and the second end. The second mounting member configured to mount the fish rod to the apparatus.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
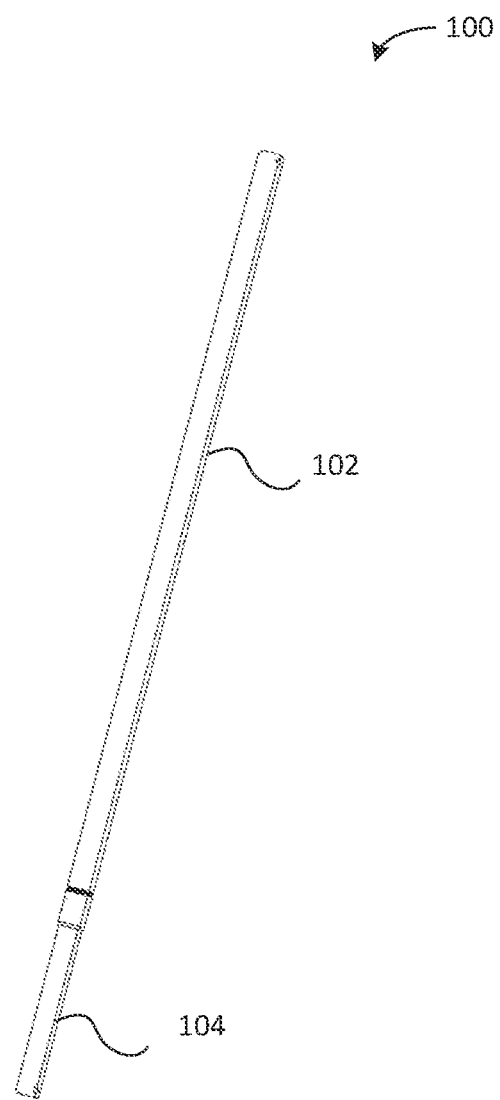
FIG. 1 shows telescoping member of the apparatus, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Figure 2:
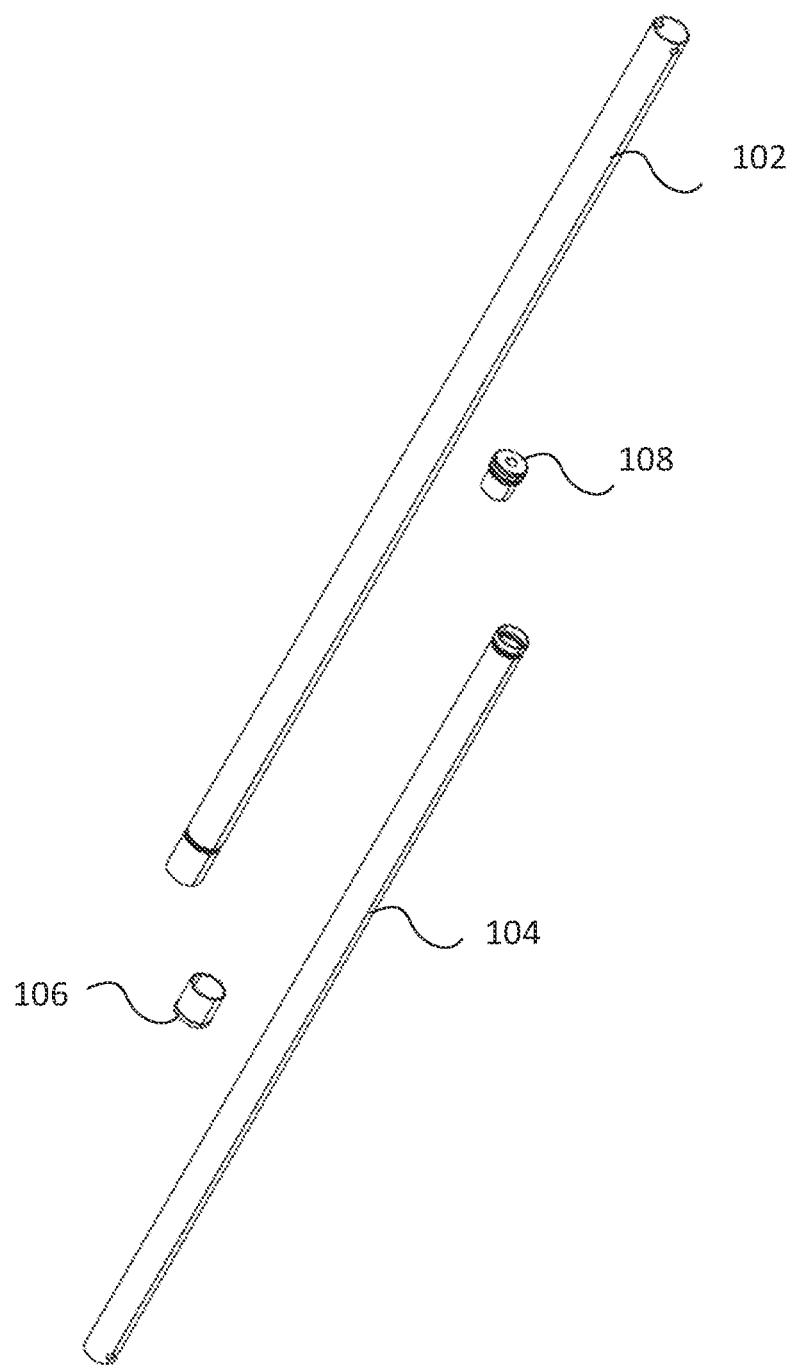
FIG. 2 is an exploded view of the telescoping member of FIG. 1, according to an exemplary embodiment of the present invention.

The present invention is directed to an apparatus for holding and transporting an elongated article, such as a fishing rod. Referring to FIG. 1, the apparatus includes telescoping tubes 100. The telescoping tubes including an outer tube 102 and an inner tube 104. FIG. 2 shows an exploded view of the telescoping tubes 100. Each of the inner tube 104 and the outer tube 102 having a proximal end and a distal end. The inner tube 104 is having a diameter less than the diameter of the outer tube 102. This allows the proximal end of the inner tube 104 to be telescopically slidable within the outer tube 102. The proximal end of the inner tube 104, through the proximal end of the outer tube 102, can be slidably inserted into the outer tube 102. Furthermore, it can be seen in FIG. 2 are a glide sleeve 106 and a glide plug 108. The glide sleeve 106 can fit into the proximal end of the outer tube 102. The glide plug 108 can fit into the proximal end of the inner tube 104. The glide sleeve 106 and the glide plug 108 can allow the inner tube 104 to snugly slide within the outer tube 102. In one case, the glide sleeve 106 and the glide plug 108 can be made of plastic material, such as polypropylene (PP). In one case, the glide sleeve 106 and the glide plug 108 can be manufactured by injection molding process.

Figure 3:
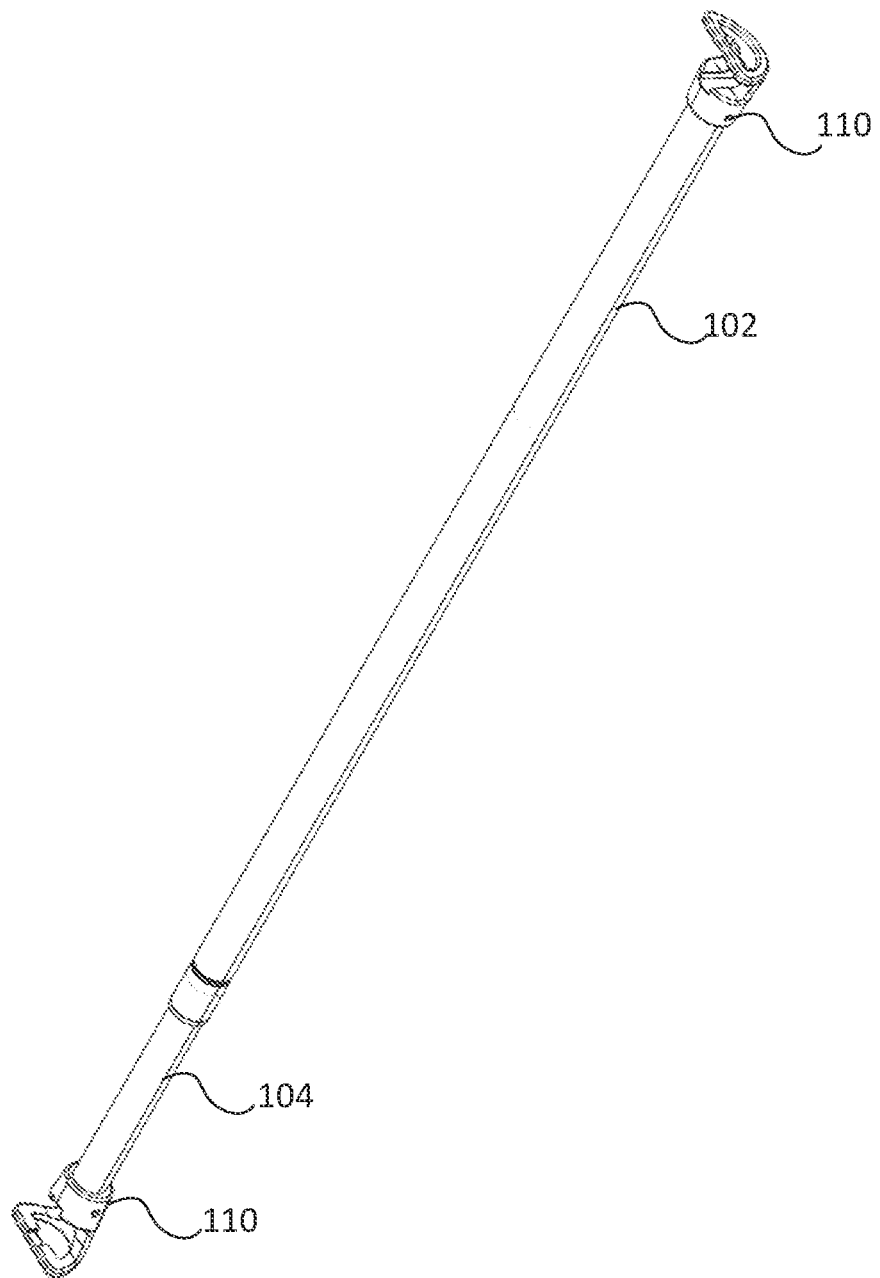
FIG. 3 shows the telescoping member of FIG. 1 having a pair of caps at the opposite ends, according to an exemplary embodiment of the present invention.
Figure 4:
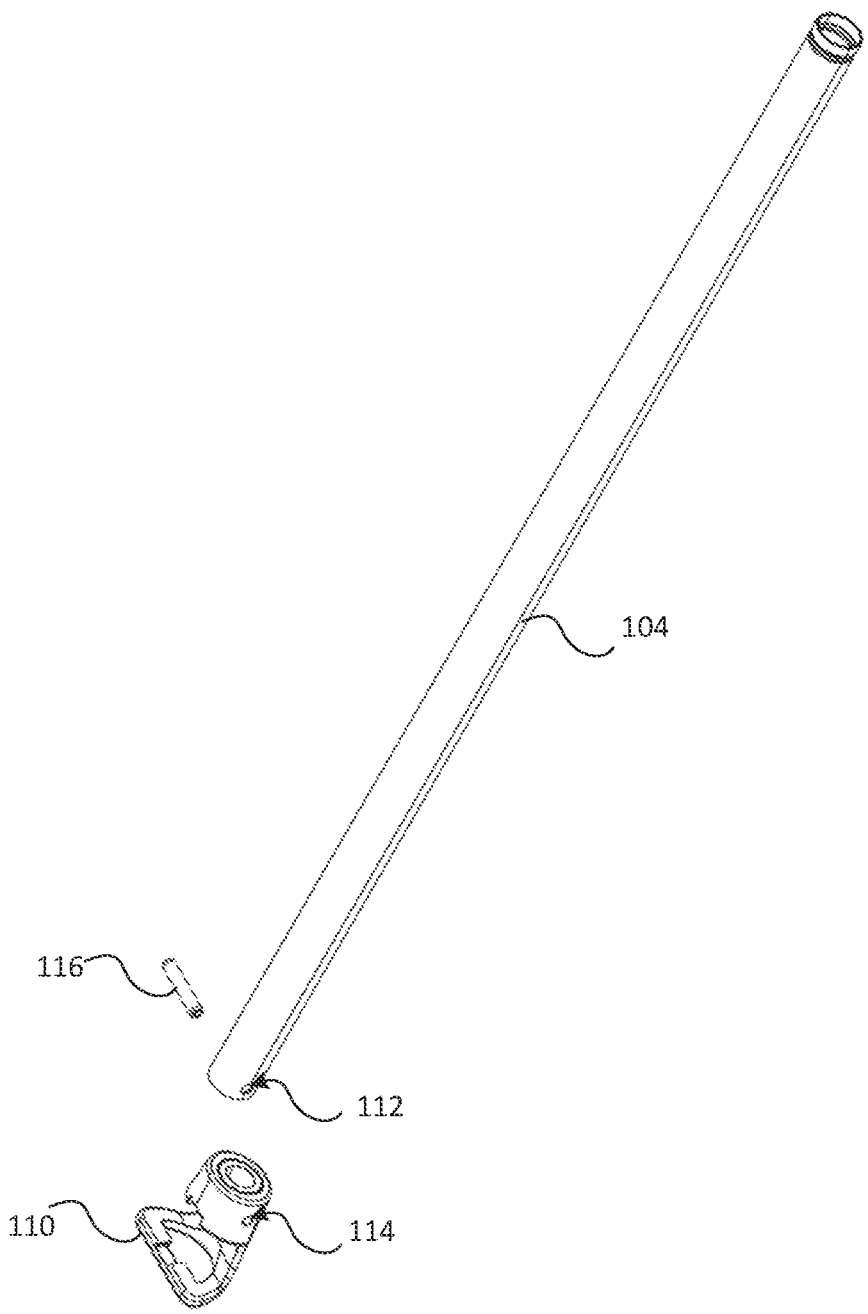
FIG. 4 is an exploded view showing the cap and the inner tube, according to an exemplary embodiment of the present invention.

FIG. 3 shows a pair of caps 110 each coupled to each of the distal ends of the inner tube 104 and the outer tube 102. FIG. 4 shows an exploded view of the inner tube 104 coupled to the cap 110. The inner sleeve having an aperture 112 at the distal end. The cap 110 can also have a corresponding aperture 114, wherein when the cap is fitted over the inner tube 104, the aperture 114 of the cap 110 can be aligned with the aperture 112 of the inner tube 104. The cap 110 can be fixed to the inner tube 104 through a locking pin 116, wherein the locking pin 116 can pass through the aligned apertures. In one case, the caps 110 can be made of TPEE material by an injection molding process. In one case, the locking pin 116 can be made of metal, such as stainless steel.

Although the glide sleeve 106 and the glide plug 108 keep the outer tube 102 and the inner tube 104 snugly fitted, in an alternate embodiment, the outer tube can be provided with a locking mechanism. The locking mechanism can prevent longitudinal movement of the inner tube relative to the outer tube. A user may adjust the length of the apparatus by releasing the lock and moving the inner tube up and down within the outer tube. The locking mechanism can be a collar that is rotatable to compress the inner tube and the outer tube, binding them at a set length. The lock may also be a set screw bolt that passes through the outer tube and presses against the inner tube. The outer tube and the inner tube may be any shape of an elongate tube. In one implementation the inner tube and outer tube may be rectangular, elliptical, or triangular elongate tubes.

Figure 5A:
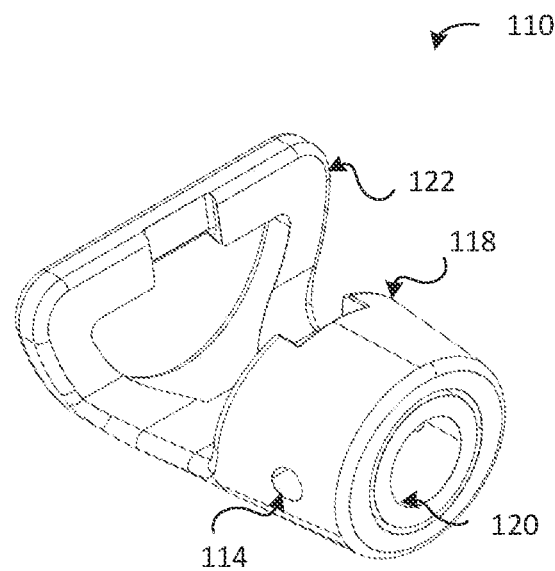
FIG. 5A shows an enlarged view of the cap, according to an exemplary embodiment of the present invention.
Figure 5B:
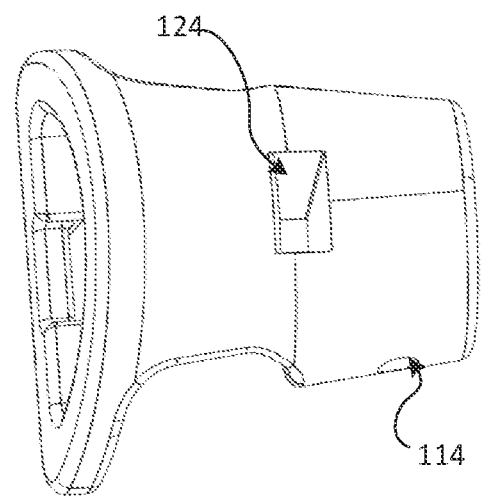
FIG. 5B shows another view of the cap of FIG. 5A, according to an exemplary embodiment of the present invention.
Figure 6:
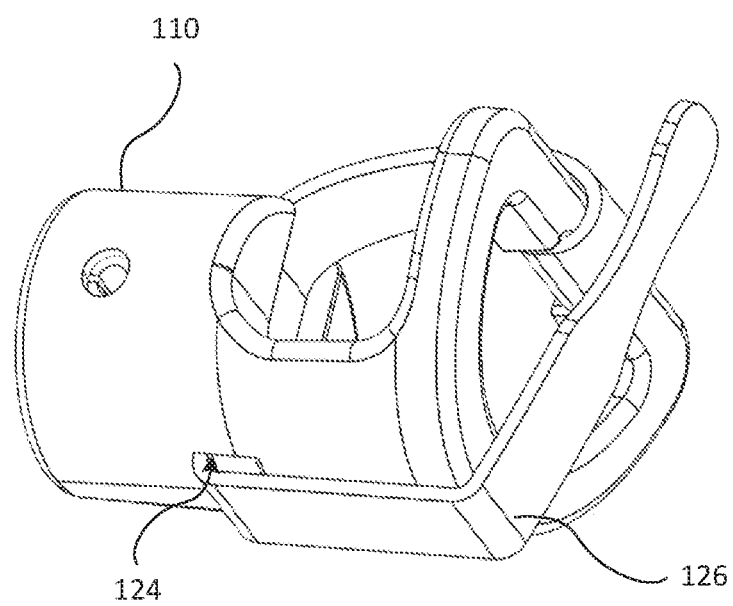
FIG. 6 shows a Velcro® strap (hook and loop fastener strap) coupled to the cap, according to an exemplary embodiment of the present invention.

FIGS. 5A and 5B show a close view of the cap 110. The cap includes a body 118 having opposite ends. The one end of the body 118 is configured as a sleeve 120. The inner diameter of the sleeve 120 can be equal to the outer diameter of the inner tube 104 or the outer tube 102. This allows each distal ends of the inner tube 104 and the outer tube 102 to be received into the sleeve 120, as shown in FIG. 3. Alternatively, the sleeve 120 can be substituted with a protrusion that can snugly fit into the opening of each distal end of the inner tube 104 and the outer tube 102. The opposite end of the body 118 of the cap 110 can be configured as an integrated L-shape bracket 122. The L-shaped bracket 122 having a first leg and a second leg perpendicular to the first leg. Furthermore, it can be seen in FIG. 5B is a slot 124 extending through body 118 of the cap 110. The second leg having an opening in its central part and resembles a latch. FIG. 6 shows the cap 110 having a Velcro® strap 126 passing through the slot 124. The Velcro® strap 126 is shown to be having its first end coupled with the latch while the other end passes through the slot 126 to wrap the L-shaped bracket 122. Velcro® strap 126 can include any type of hook and look fastener. It is understood that the terms Velcro® and "hook and loop fastener" are interchangeably used in the specification.

Figure 7:
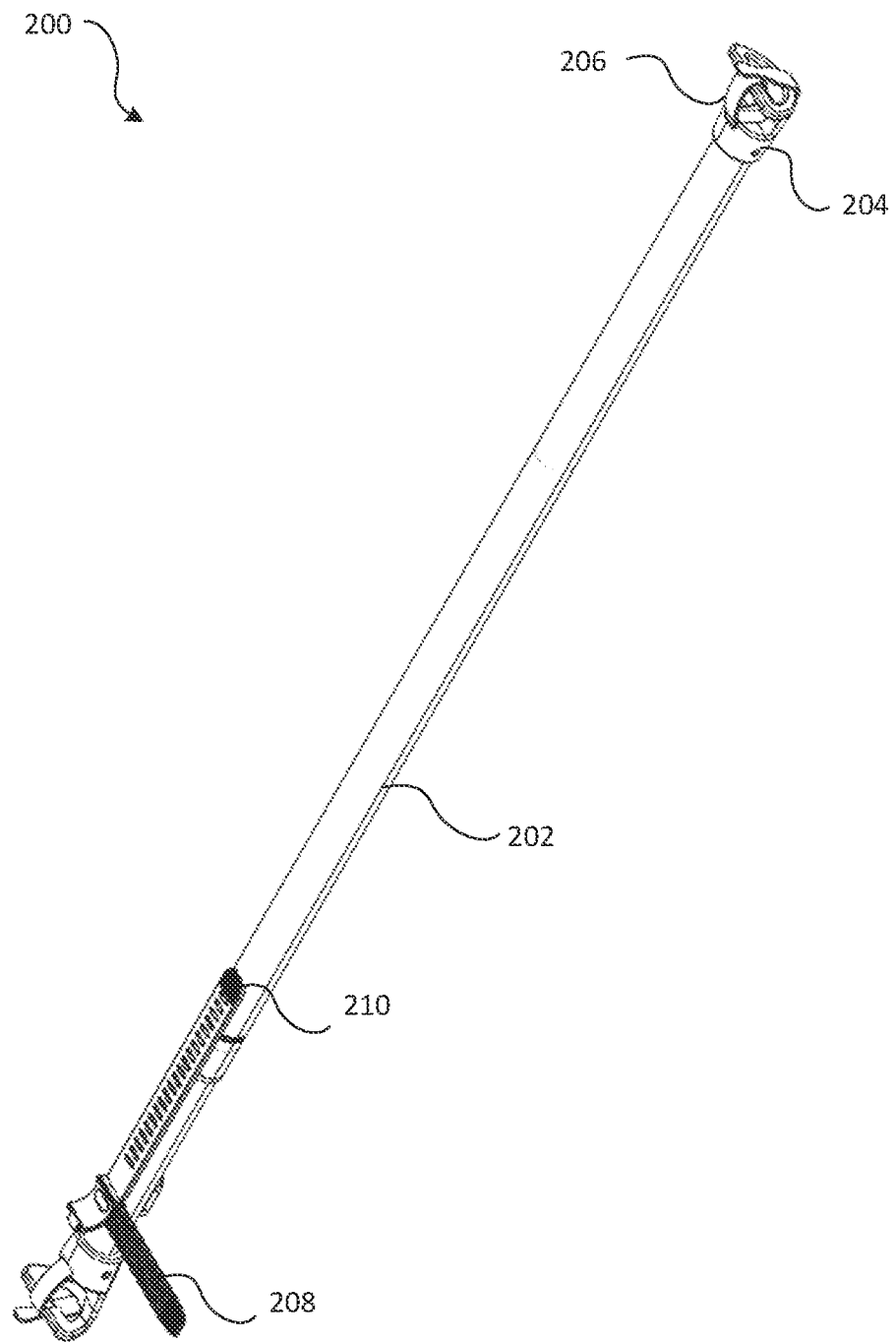
FIG. 7 is a perspective view of the apparatus, according to an exemplary embodiment of the present invention.
Figure 8:
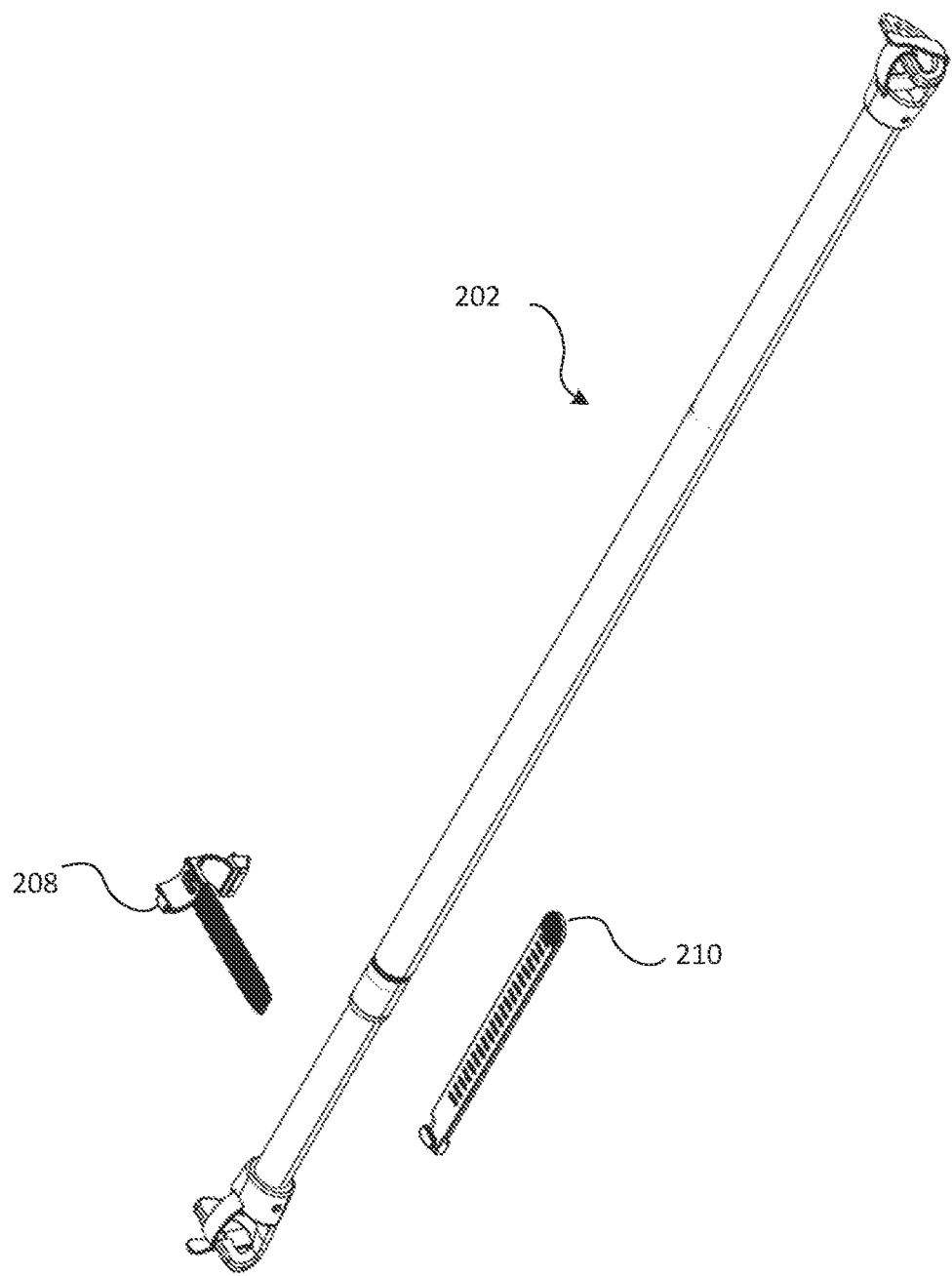
FIG. 8 is an exploded view of the apparatus of FIG. 7 showing the first mounting member and the second mounting member, according to an exemplary embodiment of the present invention.

FIG. 7 shows an embodiment of apparatus 200 of the present invention. The apparatus 200 includes a telescoping member 202, a pair of caps 204 coupled to the opposite ends of the telescoping member 202. Each cap 204 having a Velcro® strap 206, wherein one end of the Velcro® strap 206 can be coupled to the latch of the cap 204. Furthermore, it can be seen in FIG. 7 is a first mounting member 208 and a second mounting member 210. FIG. 8 is an exploded view of the apparatus 200 showing the first mounting member 208 and a second mounting member 210. The first mounting member 208 is wrapped around the telescoping member 202 and the second mounting member 210 is coupled to the first mounting member 208. The second mounting member 210 can be used to hold an elongated object such as a fish rod, wherein the second mounting member 210 can be coupled to the rod of the fish rod. The first mounting member is shown in FIG. 1 can be a tie-down bracket and the second mounting member 210 can be a strap.

Figure 9:
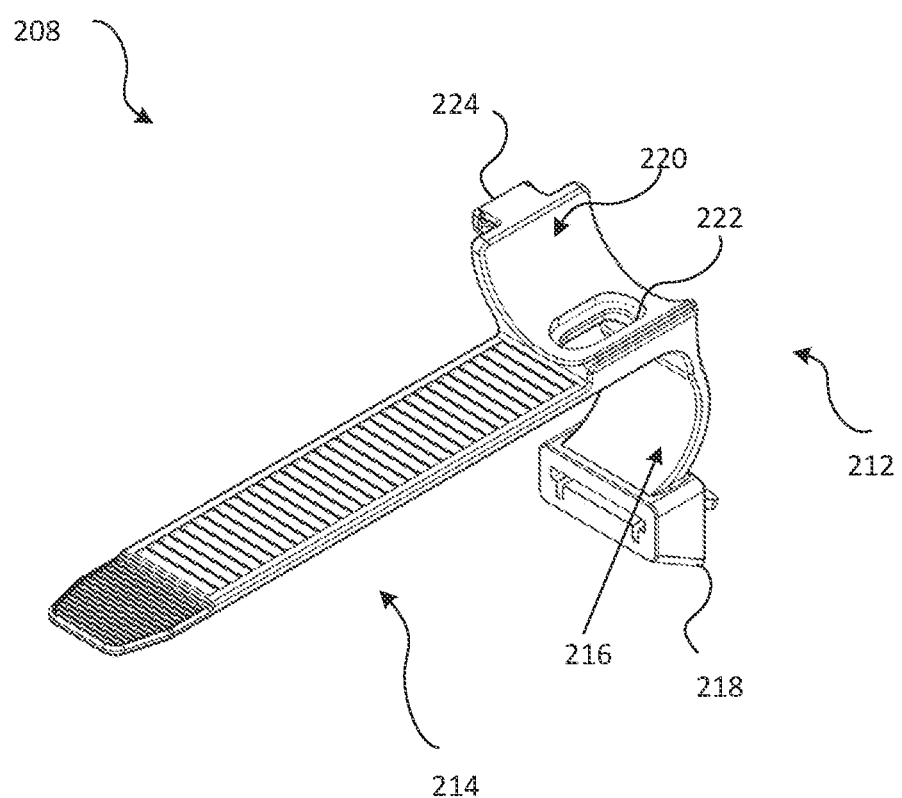
FIG. 9 is a perspective view of the first mounting member, according to an exemplary embodiment of the present invention.

FIG. 9 shows a perspective view of the first mounting member 208 having a rigid bracket part 212 and a tie-down part 214. The bracket part 212 is rigid and includes a first curvature 216 dimensioned to fit around the telescoping member 202. The end of the bracket part 212 can be configured with a tie-down lock 218 for receiving and interlocking the tie-down part 214. From the other end of the rigid bracket part 212, extends the tie-down part 214. The tie-down part 214 having a plurality of ridges which interlocks with the tie-down lock 218 for retaining the tie-down part 214. The first mounting member 208 at its rigid bracket part 212 can be positioned over the telescoping member 202 and thereafter the tie-down part 214 can wrap around the telescoping member 202 and the free end of the tie-down part 214 can be inserted into the tie-down lock 218 and pulled to tightly wrap the first mounting member 208 over the telescoping member 202.

Figure 10:
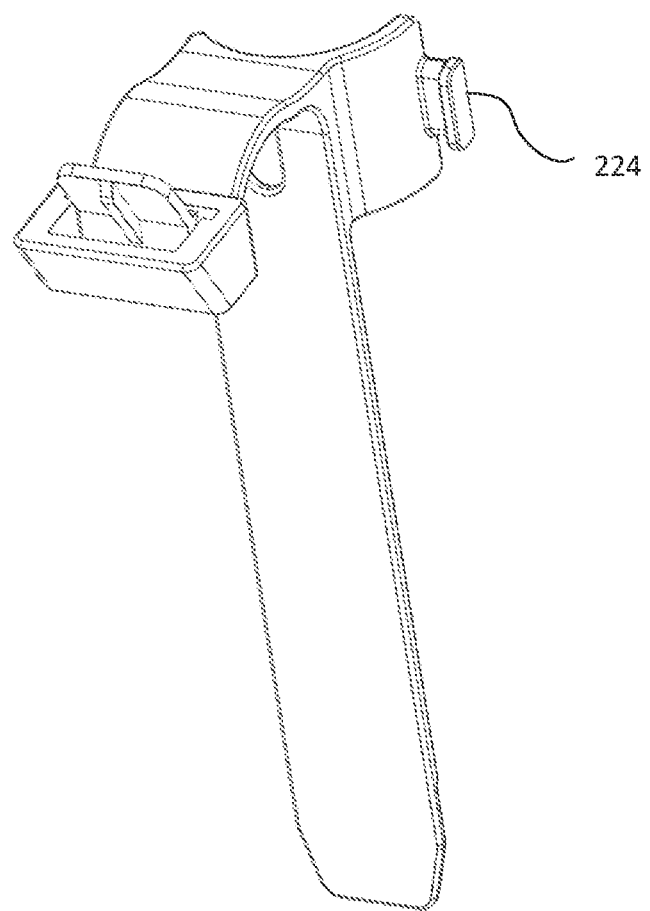
FIG. 10 is another perspective view of the first mounting member of FIG. 9, according to an exemplary embodiment of the present invention.

The rigid bracket part 212 further includes a second curvature 220 adjacent to the first curvature 216. The second curvature 220 can be dimensioned to fit around an elongated article for carrying the elongated article by the apparatus 200. In one case, the second curvature 220 can be dimensioned to fit around the fishing rod. The second curvature 220 includes an elongated slot 222 for coupling the second mounting member 210. The second curvature 220 further includes a protrusion 224 more clearly seen in FIG. 10. The protrusion 220 can engage with apertures of the second mounting member 210. In one case, the first mounting member 210 can be made of plastic material, such as TPEE. The first mounting member 210 can be manufactured by an injection molding process. The second mounting member 210 can be a rubber strap that can be manufactured by a molding process.

Figure 11:
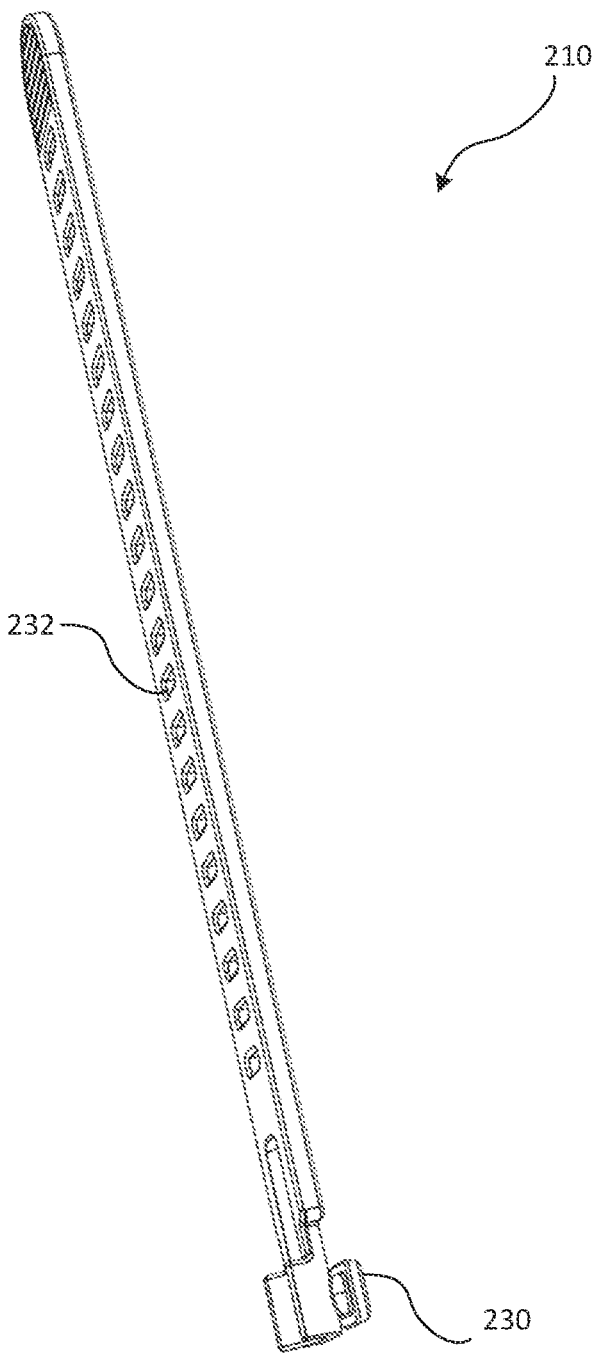
FIG. 11 is a perspective view of the second mounting member, according to an exemplary embodiment of the present invention.
Figure 12:
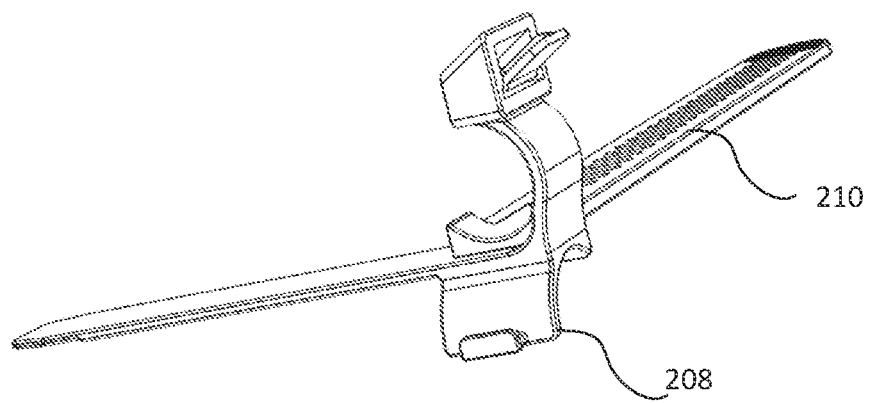
FIG. 12 shows the first mounting member coupled to the second mounting member, according to an exemplary embodiment of the present invention.

An embodiment of the second mounting member 210 is shown in FIG. 11, which is a rubber strap. The rubber strap on its first end is having a mushroom shape protrusion 230 that can snap-fit into the elongated slot 222 shown in FIG. 9. This allows the rubber strap to couple to the first mounting member 218. The other end of the rubber strap is free. Between the two ends of the rubber strap are spaced apart apertures 232 configured to interlock with the protrusion 224, shown in FIG. 9, of the first mounting member 208. The rubber strap can be coupled to the tie-down bracket i.e., the first mounting member 208, wherein the tie-down bracket is coupled to the telescoping member 202 of the apparatus 200. Thereafter the fishing rod can be positioned over the second curvature 220, shown in FIG. 9, of the first mounting member 208. The second mounting member 210 can then be wrapped around the fishing rod and secured to the first mounting member 208, wherein one of the apertures 232 interlocks with the protrusion 224. FIG. 12 shows the first mounting member 208 coupled to the second mounting member 210.

The apparatus 200 can be mounted to the interior of the vehicle easily without a need for drilling holes in the body of the vehicle. The caps 204 having the Velcro® straps 206 can be positioned over the clothing hook or grab handles of the vehicle. The length of the apparatus 200 can be adjusted by sliding the inner relative to the outer tube of the telescoping member 202. One of the cap 204 can be secured to the clothing hook or grab handle by the Velcro® strap 206. Similarly, the other end of the apparatus can also be secured to the second clothing hook or grab handle by the Velcro® strap 206. The fishing rod can then be secured to the second mounting member 210 for transportation. Alternatively, the fishing rod can be first coupled to the apparatus 200, and thereafter the apparatus 200 can be secured to the clothing hook or the grab handle of the vehicle. The apparatus 200 can be used to hold and transport any article similar to a fishing rod, such as brooms, shovels, and racks.

Figure 13:
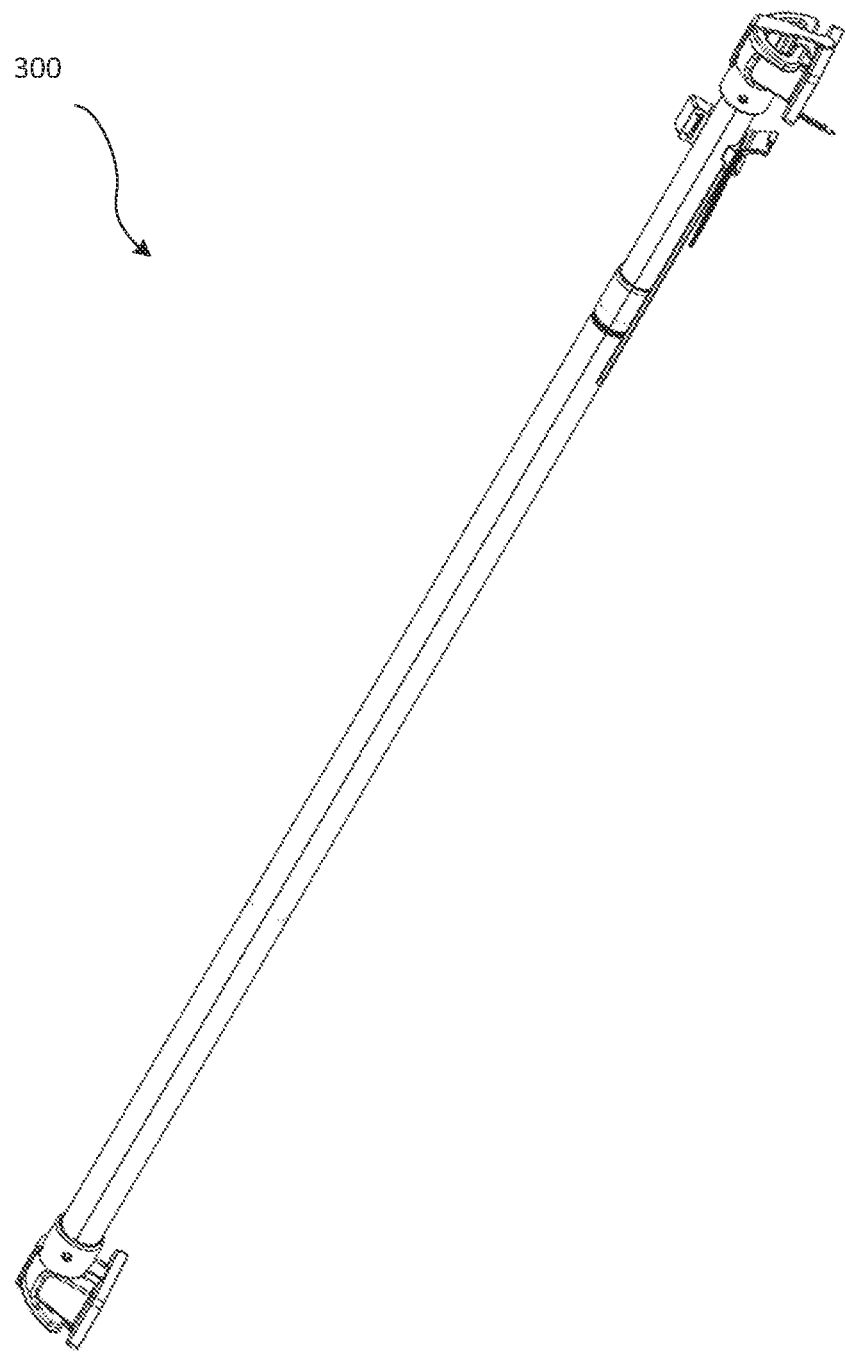
FIG. 13 is a perspective view of another exemplary embodiment of the apparatus, according to the present invention.
Figure 14:
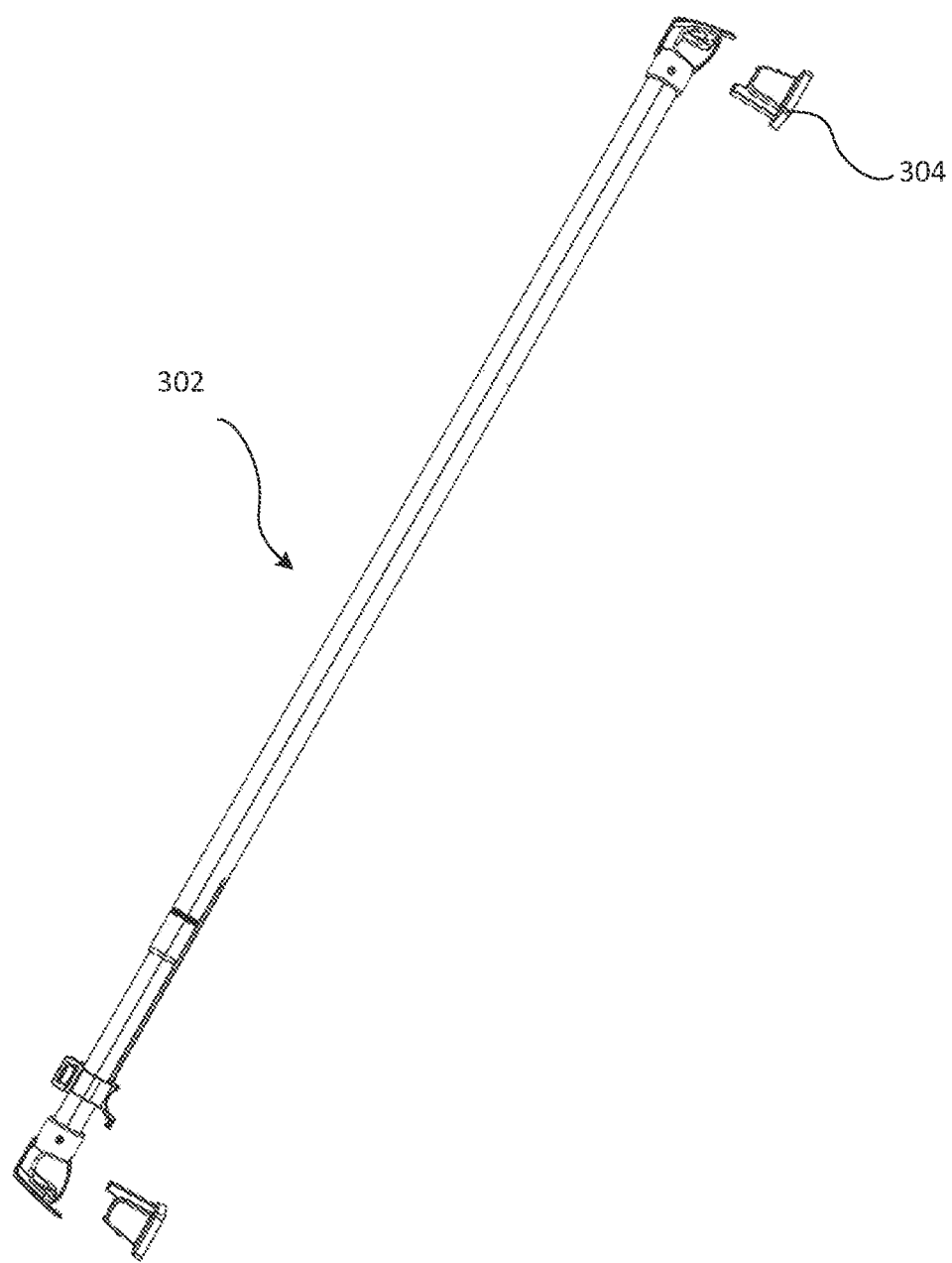
FIG. 14 is an exploded view of the apparatus of FIG. 13 showing the assembly and the wall mounting members, according to an exemplary embodiment of the present invention.
Figure 15:
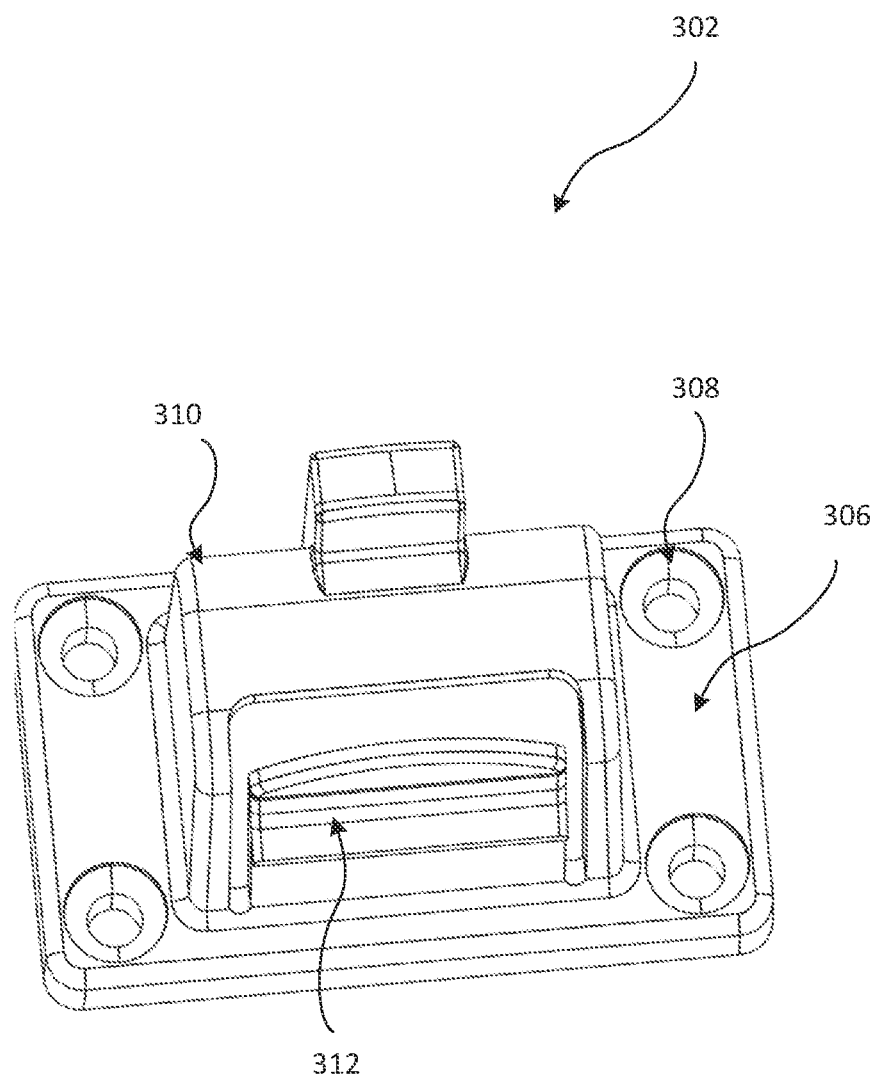
FIG. 15 is a top view of the wall mounting member, according to an exemplary embodiment of the present invention.
Figure 16:
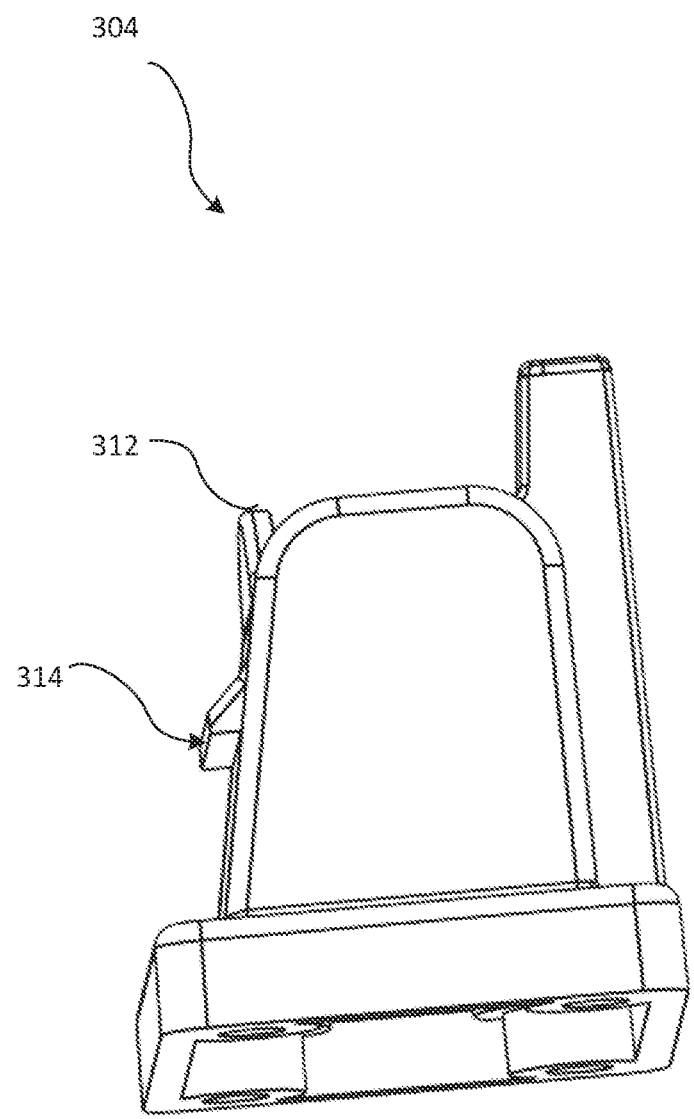
FIG. 16 is a side view of the wall mounting member, according to an exemplary embodiment of the present invention.

FIG. 13 shows another embodiment of the present invention wherein the apparatus 300 further comprises wall mounting brackets. FIG. 14 shows the assembly 302 and the wall mounting brackets 304. The assembly 302 is similar to the apparatus 200. The assembly 302 can be also be secured to a supporting structure such as a wall, wherein the mounting brackets 304 are first secured to the supporting structure, and thereafter the assembly 302 can be releasably secured to the wall mounting brackets 304. FIG. 15 shows a top view of the wall mounting brackets 304 having a base 306. The base 306 is having a flat bottom surface that faces the supporting structure. Four holes 308 are provided in the base for mounting the base 306 to the supporting surface. A spacer 310 upstands from the base 306. The spacer 310 is having a hollow interior and an open front side. Adjacent the front side of the spacer 310 is a tongue 312 that also upstands from the base 306. The tongue 312 can flex inwards towards the interior of the spacer 310. Shown in FIG. 16 is the tongue 312 further having a lip 314 extending from the outer surface of the lip 314.

Figure 17:
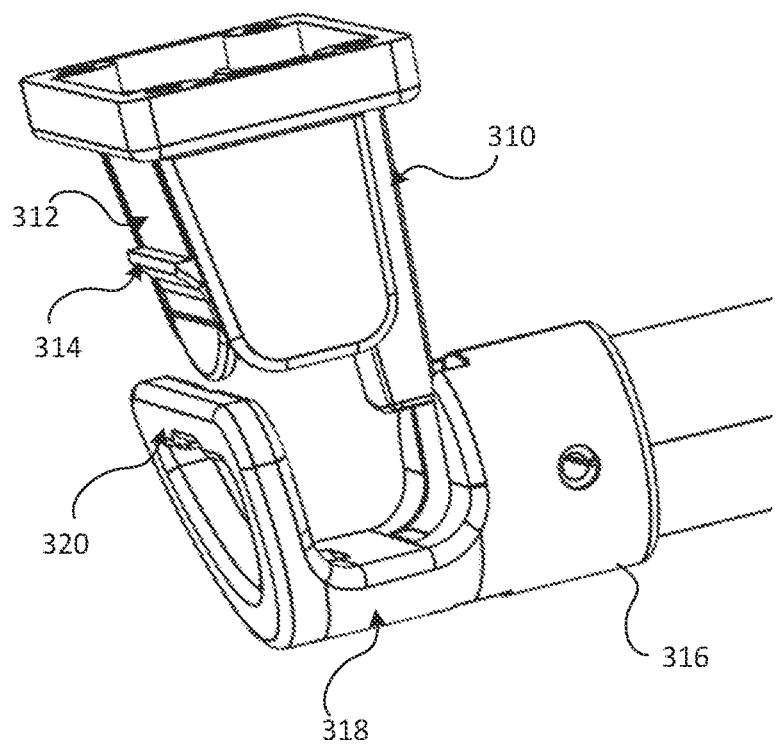
FIG. 17 shows the mechanism of securing the cap to the wall mounting member, according to an exemplary embodiment of the present invention.

FIG. 17 shows the mechanism of securing the assembly 302 to the wall mounting bracket 304. As explained above for apparatus 200, the ends of assembly are having caps 316. The part of the cap 316 configured as an L-shaped bracket 318. The L-shaped bracket 318 having a first leg and a second leg perpendicularly extending from the first leg. The second leg is configured as a latch 320. The assembly 302 can be positioned over the wall mounting bracket 304 as shown in FIG. 17. The spacer 310 can be received within the L-shaped bracket 318. While the assembly 302 is pushed over the wall mounting brackets 304, the latch 320 engages with the lip 314 and forces the tongue 312 to flex inwards. Flexing of the tongue 312 results in sliding of the latch over the lip 314, wherein the cap 316 snap-fits to the wall mounting bracket 304. This way, the assembly 302 can be mounted to the wall mounting bracket 304, which are already mounted to the wall. To release the assembly 302, the tongue 312 at its tip can be pressed by a finger causing it to flex inwards. Once the tongue flex inwards, the assembly can be pulled out, thus releasing the assembly 302 form the wall mounting bracket 304.

Figure 18:
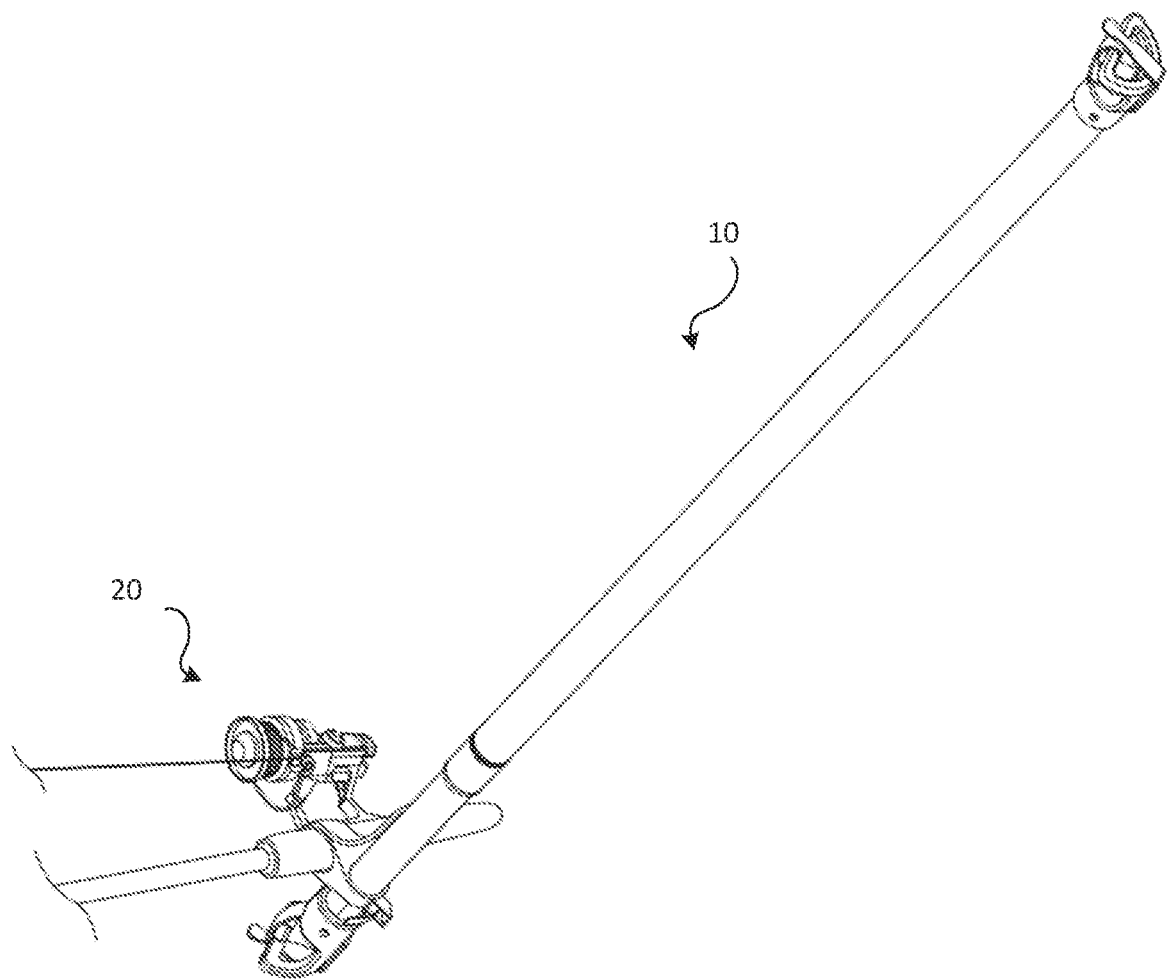
FIG. 18 shows a fishing rod mounted to the disclosed apparatus, according to an exemplary embodiment of the present invention.

FIG. 18 shows a fishing rod 20 mounted to the disclosed apparatus 10.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus for holding and transporting an elongated article, the apparatus comprising:
   a telescoping member having a proximal end and a distal end;
   a first cap coupled to the proximal end and a second cap coupled to the distal end of the telescoping member;
   a first mounting member releasably coupled to the telescoping member;
   a second mounting member releasably coupled to the first mounting member, the first mounting member and the second mounting member are configured to receive and hold an elongated article; and
   a first hook and loop fastener strap coupled to the first cap and a second hook and loop fastener strap coupled to the second cap,
   wherein the first cap comprises a first cap body having a first portion and a second portion that is opposite to the first portion, the first portion of the first cap body is configured as a sleeve for receiving the proximal end of the telescoping member,
   wherein the second cap comprises a second cap body having a first portion and a second portion that is opposite to the first portion, the first portion of the second cap body is configured as a sleeve for receiving the distal end of the telescoping member,
   wherein the second portion of the first cap body is configured as a first L-shaped bracket, the first L-shaped bracket comprises a first leg extending from the sleeve of the first cap body and a second leg perpendicularly extends from the first leg of the first L-shaped bracket, the second leg of the first L-shaped bracket is configured as a first latch, wherein the second portion of the second cap body is configured as a second L-shaped bracket, the second L-shaped bracket comprises a first leg extending from the sleeve of the second cap body and a second leg perpendicularly extends from the first leg of the second L-shaped bracket, the second leg of the second L-shaped bracket is configured as a second latch, wherein the sleeve of the first cap body has a first slot, a proximal end of the first hook and loop fastener strap is coupled to the first latch and a distal end of the first hook and loop fastener extends through the first slot, wherein the sleeve of the second cap body has a second slot, a proximal end of the second hook and loop fastener strap is coupled to the second latch and a distal end of the second hook and loop fastener extends through the second slot.

2. The apparatus of claim 1, wherein the apparatus further comprises a first wall mounting bracket and a second wall mounting bracket both configured for mounting to a supporting structure, the first wall mounting bracket and the second wall mounting bracket are configured to releasably engage with the first cap and the second cap respectively.

3. The apparatus of claim 1, wherein the elongated article is a fish rod.

4. The apparatus of claim 1, wherein the telescoping member comprises an inner tube and an outer tube, a diameter of the inner tube is less than a diameter of the outer tube, the inner tube has a proximal end and a distal end, the outer tube has a proximal end and a distal end, wherein the proximal end of the inner tube is slidably received into the outer tube though the distal end of the outer tube, wherein the inner tube is configured to slide within the outer tube.

5. The apparatus of claim 4, wherein the telescoping member further comprises a guide sleeve coupled to the distal end of the outer tube and a plug coupled to the proximal end of the inner tube, wherein the guide sleeve and the plug allow the inner tube to snugly slide within the outer tube.

6. The apparatus of claim 1, wherein the first mounting member comprises:
a rigid bracket part, the rigid bracket part having a first end and a second end, to the first end of the rigid bracket part is coupled a tie-down lock, and
a tie-down part, the tie-down part extends from the second end of the rigid bracket part, a free end of the tie-down part is configured to pass through the tie-down lock,
the rigid bracket part further comprises a first curvature extending between the first end and the second end, the first curvature dimensioned to fit over the telescoping member.

7. The apparatus of claim 6, wherein the rigid bracket part further comprises a second curvature integrated at the second end of the rigid bracket part, the second curvature faces away from the first end of the rigid bracket part, the second curvature dimensioned to fit around the elongated article such that the elongated article and the telescoping member extend perpendicular to each other.

8. The apparatus of claim 7, wherein the rigid bracket part further comprises a slot in the second end of the rigid bracket part that extends through the second curvature, a second protrusion coupled to an end of the second curvature, the second mounting member comprises a strap having a first strap end and a second strap end, the first strap end has a third protrusion that interlocks with the slot of the rigid bracket part, a plurality of spaced-apart apertures in the strap, each aperture of the plurality of spaced-apart apertures configured to interlock with the second protrusion.

9. The apparatus of claim 1, wherein the apparatus further comprises a pair of wall mounting brackets, a first wall mounting bracket and a second wall mounting bracket, each of the pair of wall mounting brackets has a base, the base has a flat bottom and at least two holes in the flat bottom for mounting the each of the pair of wall mounting brackets to a supporting structure, a spacer upstands from a top surface of the base, the spacer is hollow from inside and has its front side open, a tongue upstands from the base and adjacent to the front side of the spacer, a lip configured on an exposed surface of the tongue.

10. The apparatus of claim 9, wherein the spacer and the tongue of the first wall mounting bracket are configured to secure to the first cap, wherein the sleeve of the first cap body and the first L-shaped bracket form a U-shaped cavity configured to receive the spacer and tongue of the first wall mounting bracket such that the first latch snaps over the lip of the first wall mounting bracket securing the first cap to the first wall mounting bracket, and
wherein the spacer and the tongue of the second wall mounting bracket are configured to secure to the second cap, wherein the sleeve of the second cap body and the second L-shaped bracket form a U-shaped cavity configured to receive the spacer and tongue of the second wall mounting bracket such that the second latch snaps over the lip of the second wall mounting bracket securing the second cap to the second wall mounting bracket.

11. An apparatus for holding and transporting an elongated article, the apparatus comprising:
a telescoping member having a proximal end and a distal end;
a first cap coupled to the proximal end and a second cap coupled to the distal end of the telescoping member;
a first mounting member releasably coupled to the telescoping member;
a second mounting member releasably coupled to the first mounting member, the first mounting member and the second mounting member are configured to receive and hold an elongated article; and
a first hook and loop fastener strap coupled to the first cap and a second hook and loop fastener strap coupled to the second cap,
wherein the first mounting member comprises:
a rigid bracket part, the rigid bracket part having a first end and a second end, to the first end of the rigid bracket part is coupled a tie-down lock, and
a tie-down part, the tie-down part extends from the second end of the rigid bracket part, a free end of the tie-down part is configured to pass through the tie-down lock,
the rigid bracket part further comprises a first curvature extending between the first end and the second end, the first curvature dimensioned to fit over the telescoping member,
wherein the rigid bracket part further comprises a second curvature integrated at the second end of the rigid bracket part, the second curvature faces away from the first end of the rigid bracket part, the second curvature dimensioned to fit around the elongated article such that the elongated article and the telescoping member extend perpendicular to each other, wherein the rigid bracket part further comprises a slot in the second end of the rigid bracket part that extends through the second curvature, a second protrusion coupled to an end of the second curvature, the second mounting member comprises a strap having a first strap end and a second strap end, the first strap end having a third protrusion that interlocks with the slot of the rigid bracket part, a plurality of spaced-apart apertures in the strap, each aperture of the plurality of spaced-apart apertures are configured to interlock with the second protrusion.

12. An apparatus for holding and transporting an elongated article, the apparatus comprising:
- a telescoping member having a proximal end and a distal end;
- a first cap coupled to the proximal end and a second cap coupled to the distal end of the telescoping member;
- a first mounting member releasably coupled to the telescoping member;
- a second mounting member releasably coupled to the first mounting member, the first mounting member and the second mounting member are configured to receive and hold an elongated article; and
- a first hook and loop fastener strap coupled to the first cap and a second hook and loop fastener strap coupled to the second cap,
- wherein the first cap comprises a first cap body having a first portion and a second portion opposite the first portion, the first portion of the first cap body configured as a sleeve for receiving the proximal end of the telescoping member,
- wherein the second cap comprises a second cap body having a first portion and a second portion opposite the first portion, the first portion of the second cap body configured as a sleeve for receiving the distal end of the telescoping member,
- wherein the second portion of the first cap body is configured as a first L-shaped bracket, the first L-shaped bracket comprises a first leg extending from the sleeve of the first cap body and a second leg perpendicularly extends from the first leg of the first L-shaped bracket, the second leg of the first L-shaped bracket is configured as a first latch,
- wherein the second portion of the second cap body is configured as a second L-shaped bracket, the second L-shaped bracket comprises a first leg extending from the sleeve of the second cap body and a second leg perpendicularly extends from the first leg of the second L-shaped bracket, the second leg of the second L-shaped bracket is configured as a second latch,
- wherein the apparatus further comprises a pair of wall mounting brackets, a first wall mounting bracket and a second wall mounting bracket, each of the pair of wall mounting brackets has a base, the base has a flat bottom and at least two holes in the flat bottom for mounting the each of the pair of wall mounting brackets to a supporting structure, a spacer upstands from a top surface of the base, the spacer is hollow from inside and has its front side open, a tongue upstands from the base and adjacent to the front side of the spacer, a lip configured on an exposed surface of the tongue.

13. The apparatus of claim 12, wherein the spacer and the tongue of the first wall mounting bracket are configured to secure to the first cap, wherein the sleeve of the first cap body and the first L-shaped bracket forms a U-shaped cavity configured to receive the spacer and tongue of the first wall mounting bracket, such that the first latch snaps over the lip of the first wall mounting bracket securing the first cap to the first wall mounting bracket, and
wherein the spacer and the tongue of the second wall mounting bracket are configured to secure to the second cap, wherein the sleeve of the second cap body and the second L-shaped bracket form a U-shaped cavity configured to receive the spacer and tongue of the second wall mounting bracket, such that the second latch snaps over the lip of the second wall mounting bracket securing the second cap to the second wall mounting bracket.

* * * * *